United States Patent [19]

Hahn et al.

[11] Patent Number: 4,801,005
[45] Date of Patent: Jan. 31, 1989

[54] OIL DRIPPING ABSORPTION AND CONTAINMENT KIT

[76] Inventors: Annerose Hahn; George T. Hahn, both of 2815 Inverness Dr., La Jolla, Calif. 92037

[21] Appl. No.: 40,291

[22] Filed: Apr. 20, 1987

[51] Int. Cl.$^4$ .................. F16N 31/02; B32B 7/00; B65D 69/00

[52] U.S. Cl. .................. 141/98; 141/86; 184/106; 184/1.5; 15/215; 220/1 C; 222/108; 206/494

[58] Field of Search ............... 141/98, 86, 87; 15/215; 184/1.5, 109, 106; 137/312, 314; 222/108; 220/1 C; 206/204, 226, 223, 524.3, 494, 207; 34/45, 94; 55/524, 527; 126/901; 210/924

[56] References Cited

U.S. PATENT DOCUMENTS

| | | | |
|---|---|---|---|
| 1,094,210 | 4/1914 | Hughes | 184/106 |
| 1,261,358 | 4/1918 | Cagnino | 184/106 |
| 2,057,162 | 10/1936 | Richey | 184/106 X |
| 2,497,565 | 2/1950 | Stark | 184/1.5 X |
| 2,757,478 | 8/1956 | Borland | 184/106 X |
| 3,062,323 | 11/1962 | Oganovic | 184/106 |
| 3,141,522 | 7/1964 | Fitzpatrick | 184/106 |
| 3,228,491 | 1/1966 | Gatsos | 184/106 |
| 3,284,273 | 11/1966 | Prentice | 184/106 X |
| 3,435,481 | 4/1969 | Kessler | 15/215 |
| 3,464,546 | 9/1969 | Thomka | 206/524.3 |
| 3,722,626 | 3/1973 | Stack | 184/106 |
| 3,785,102 | 1/1974 | Amos | 15/215 X |
| 3,809,223 | 5/1974 | Kendall | 206/204 |
| 3,834,527 | 9/1974 | Howe | 206/494 |
| 4,098,398 | 7/1978 | Meyers | 184/1.5 X |
| 4,458,814 | 7/1984 | Meschi | 206/494 |
| 4,463,847 | 8/1984 | Gordon | 206/524.3 X |
| 4,497,147 | 2/1985 | Clapper et al. | 15/215 X |
| 4,574,977 | 3/1986 | Ellis et al. | 220/403 |

Primary Examiner—Henry J. Recla
Assistant Examiner—Ernest G. Cusick

[57] ABSTRACT

This invention consists of a mat which is designed to absorb a maximum amount of oil, keep the oil from seeping onto floors or work areas, be laid flat on floors or work areas, be unfolded during removal from containers, and folded to be repackaged in the original container. This is accomplished by a mat structure which internally incorporates mineral based absorbents, is pleated, and which has an underside composed of a material that is oil and abrasion resistant. Furthermore, the receipt/storage package is designed to keep the oil soaked mats from fouling areas external to this package. Such isolation of oil contaminated materials from other refuse constitutes sound environmental policy.

1 Claim, 1 Drawing Sheet

OIL DRIPPING ABSORPTION AND CONTAINMENT KIT

BACKGROUND OF THE INVENTION (1) Field of Invention

This disclosure relates to keeping oil drippings from from garage floors with a spreadable mat, keeping oil stained mats from contaminating surrounding areas, and separating these mats from other trash materials.

In addition, this disclosure field encompasses keeping other environmentally undesirable drippings from workplace floors. These drippings include those found in food preparation locations, chemical process plants, and other refining type operations.

(2) Prior Art

Prior art in respect to removing oil drippings in automotive areas has consisted of the following elements.

(a) Washing, usually with steam or soap and water.

(b) Distributing loose oil absorbent material in areas of oil contamination, and sweeping up the loose material.

(c) Placing striped down cardboard boxes and other scrap materials mats under automotive vehicles. The soiled mats removal is left to the user's decision.

(d) Placing drip pans under automotive equipment. Disposal requires pouring out liquid oil from the pan into a disposal receptacle and cleaning the pan afterwards. This is a procedure of some awkwardness and possible respillage of the oil is a problem when handling a filled pan.

In this disclosure mats will be defined as being spreadable like a carpet. Oil pans will be defined as having a recognizable container configuration (i.e five rigid or semirigid sides), and are placed on the floor in one piece similar to the way a bucket would be placed on the floor. Also, in this disclosure the term 'disposable' shall be defined to include all elements of a mat or oil pan and to mean that all elements of the oil mat or oil pan system are removable as a single package and insertable into a standard domestic type garbage can.

The final three options have been combined a number of ways in prior inventions. A notable example is the invention of Fitzpatrick (1964 U.S. Pat. No. 3,141,522) which consists of a pan with a lowerable side in which a sack of oil absorbent material is placed. The pan material is apparently porous in that a sealant material is placed on the bottom side. No mention is made in reference to abrasion resistant material, although it would be necessary to slide the pan over the garage floor if it were to be placed under standing automotive equipment.

The patent of Fitzpatrick also describes the sack of absorbent material as 'disposable'. No mention is made of the steps required to obtain an environmentally sound disposal of this sack. If the pan and sack are to be disposed then no provision is made to keep the pan and the sack, either seperately or together, from soiling external areas or materials.

Fitzpatrick's invention also appears quit fragile. Impact with the wheels of a slow moving automobile would likely rupture it, and spill the clay absorbent over a garage floor. This fragility makes Fitzpatrick's invention unsuitable for domestic garages where automotive equipment is frequently moved. This could necessitate Fitzpatrick's oil pan being reinserted under automotive equipment every time said automotive equipment is moved.

Finally, the invention as depicted by Fitzpatrick only provides dripping protection for the engine area of an automobile. No protection is offered to the differential area, or to areas containing hydraulic lines. These areas also can produce floor fouling petroleum drippings.

Howe (1974 U.S. Pat. No. 3,834,527) presents another variation of the drip pan technique. Here the drip pan is pleated and compressed prior to deployment. As shown, the pan is partially unfolded during deployment. Absorbent material is incorporated on the edge of the pan to keep oil drippings from spilling out. Again the pan as shown does not appear to be sufficiently crush resistant to be used in domestic automotive garages.

This folded pan is not designed to be refolded to permit removal and disposal. The design of the gussets appear to be designed to place tension on the top and bottom of each pleat during unfolding. This tension locks the pleats in place so that the pan will not creep back to it's stored position. This tension lock also mitigates against refolding after use.

Meschi (1984 U.S. Pat. No. 4,458,814) presents folding as a means of storing paper data tapes, and Kendall (1974 U.S. Pat. No. 3,809,223) depicts a sealing film to protect packaged lumber from moisture intrusion.

Other variants of oil drip containment inventions include peelable mats (Clapper U.S. Pat. No. 4,497,147), filled drip pans (Stack 1973 U.S. Pat. No. 3,722,626; Prentice 1966 U.S. Pat. No. 3,284,273; Oganovic 1962 U.S. Pat. No. 3,062,323; and Hughes 1914 U.S. Pat. No. 1,094,210), pure drip pans (Stark 1950 U.S. Pat. No. 2,497,565; Cagnino 1918 U.S. Pat. No. 1,261,358; and Ellis et. al.; 1986 U.S. Pat. No. 4,574,977) and a cardboard mat with holes to facilitate oil absorption, and cardboard footpads to raise the mat off of the garage floor (Gatsos 1966 U.S. Pat. No. 3,228,491). Many of the foregoing inventions addressed the problems of oil absorbence and protection of garage floor from oil seepage. The invention of Gatsos even had a single fold to facilitate storage prior to deployment of his mat. However, none of the foregoing inventions addressed the problem of disposing of oil soaked and stained materials after use.

Meyers's invention (1978 U.S. Pat. No. 4,098,398) is a sealed container to receive used liquid oil. It contains a bladder, an entrance mouth, and a cap for the mouth once the bladder is filled. Since the present disclosure relates to inserting solid wastes into a sealed container, the method of waste insertion differs, and the requirement for for sealing also differs.

Therefore, prior art's inattention to environmentally sound waste management has led to the following deficiencies, viz:

(1) Unspecified waste receptacle, and no means of handling and/or repackaging mats after use. None of the foregoing inventions separately or together implies an oil soaked folded mat which is to be reinserted into a package lined to prevent fouling the external environment, and the entire kit sized to fit into a standard sized domestic trash can. Numerous patents exist which protect the contents of packages form oxygen and other outside contaminants. None of them addressed the problem of keeping oily materials within a package and protecting the outside environment. This difference requires that liners be non oil degradable and abrasion resistant rather than air tight, and also requires that markedly different materials, and package designs be utilized in the package disclosed in this disclosure.

(2) Insufficient specification of the mat undersealer. Oil impermiability was called out in a number of the foregoing patents. Oil non degradibility, abrasion resistance, and sufficient flexibility to permit folding before and after use as a drip mat was not specified. The materials suggested by Fitzgerald are mostly unsuitable for oil laden environments indicating that this factor was not considered in the preparation of his claim. The brief description by Howe of a pleated paper/aluminum foil inverted pan ignores this consideration entirely. Presumably the aluminum foil/paper composite would be bound together by an organic adhesive. The properties of this adhesive would be critical to the practicality of Howe's suggestion. Aluminum is not an abrasion resistant material.

(3) Inadequate absorptive material specification and/or design for proper disposal. With one exception, all called for organic, and fibrous materials. The exception was Fitzpatrick, who specified a clay material in a sack. However, nowhere in the previous art is a mineral absorbent design presented consistent with a compact storage prior to and after use or incorporation into the mat device in such a way as to increase the mat's crush resistance. The fact that waste storage is not called out in Fitzgerald's patent raises questions regarding tearing of, and spillage from sacks of oil soaked absorbents prior to or after 'disposal'. Although Fitzgerald describes his patent as suitable for disposal, it does not appear suitable for insertion into a standard domestic type garbage can.

(4) With the exception of the peelable mat of Clapper, all of the foregoing non metallic pans and mats could be disabled by crushing if overrun by automotive equipment.

SUMMARY OF THE INVENTION

To provide a useful oil drip abatement system, particularly for domestic garages, the foregoing deficiencies is addressed by selection of proper materials, and incorporation of physical design features as described in the following.

This disclosure consists of a pleated absorbent mat with an undersealer. It is foldable so as to permit compact storage prior to deployment, and also to permit reinsertion into it's container. This container has a sealing liner to prohibit oil soaked mats from fouling the external environment.

Mat undersealer and container liner materials must be oil impermeable, flexible, abrasion resistant, and non oil degradable. These requirements are typically met by rubber materials, all of which except Neoprene are oil degradable. Another candidate material is polyurethane, which is used in rock handling operations.

Absorptive materials have frequently been mentioned in previous patents. However, none have claimed to add to the crush resistance of the mat. In this disclosure the impregnation of the main mat structure with Fullers earth or other clay material adds to the load bearing capability of the mat structure.

The main structure of the mat is cardboard, although other flexible, absorptive materials can also be used. However, cardboard mats from stripped down boxes have been observed to have considerable crush resistance when spread flat on a garage floor, and are thus a prime candidate material for the main structure.

The pleating of this disclosure mat is to permit the easy packaging, unpackaging, emplacement of the mat on the floor or work area, retrieval of the soiled invention mat, and the pollution free repackaging of the retrieved invention mat. This pleating is assisted by the flexible under sealer, and the placing of the clay absorbent material will be such that mat folding will not be impeded.

The final feature of this disclosure is the package. The inside of this package is coated with either Neoprene or polyurethane. Thus, used petroleum and petroleum product absorbent mats may be reinserted into their original package and stored until they are disposed of. The liner will not permit the oil and petroleum products to foul and pollute areas and things external to the package.

DESCRIPTION OF THE PREFERRED EMBODIMENT

Figure 1:
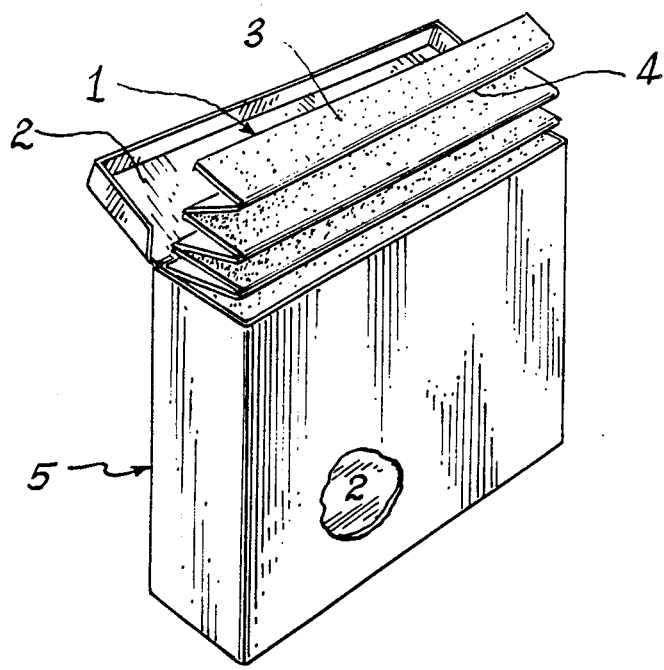
FIG. 1. shows a oil drip handling kit with the folded mat inside the container.

Relevant features of this disclosure are shown in FIG. 1. As depicted, this disclosure consists of a folded mat stored in a container. An oil impervious, oil resistant, abrasion resistant and flexible material covers the backside of the mat (1) and the inside of the container (2) (For clarity purposes the cross hatching indicating an impenetrable coating is only shown on the inside top of the container. However, the entire inside surface of the container is to be so coated.). The mat coating is Neoprene, polyurethane, or other suitable polymer suitably primed and processed and is depicted as cross hatching. Coatings for the container are polyurethane, neoprene or other suitable lining materials (shown as cross hatching, mainly orthogonal to that showing the mat coating) adhering to the cardboard sides of the container (5).

Additional features of the mat include absorbent material implanted into the cardboard or other support matrix (3). In FIG. 1 this material is represented by stippling. This absorbent material may consist of suitably treated aluminum silicates (such as Fuller's Earth), paper fibers, or a number of commercial oil absorbents. The creases in the mat, as indicated in (4), may or may not be reinforced by a woven fabric not shown in the drawing. The size of the mat components, bounded by creases suitable for folding, may vary. Depending on application they are projected to be from six inches to three feet.

Figure 2:
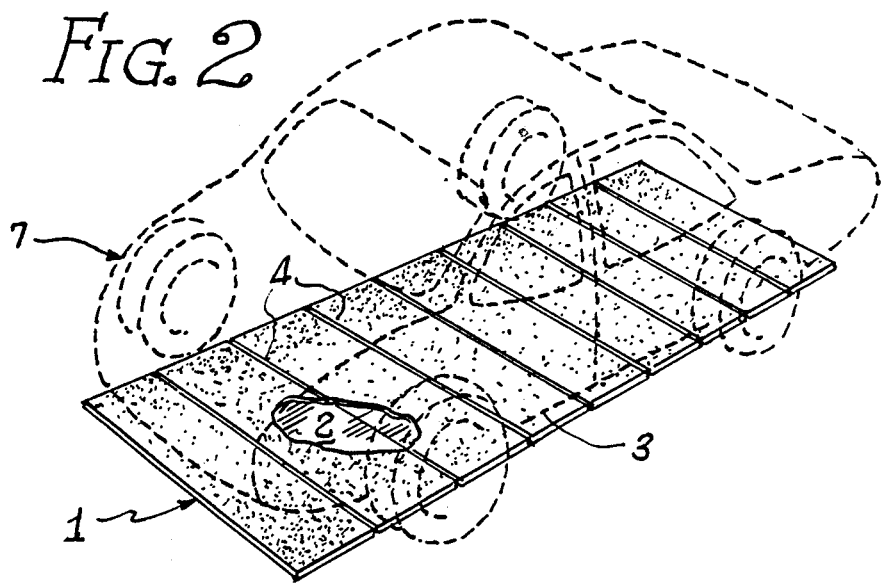
FIG. 2. shows the mat deployed underneath a piece of automotive equipment.

A perceived deployment of the subject mat is shown in FIG. 2. In this Figure a typical piece of automotive equipment is shown in phantom (7). Underneath this automotive equipment the mat is laid flat (1), with the stippling denoting absorbent material exposed, and the petroleum impenetrable underside laying against the floor, and thus hidden from view.

The preferred embodiment of this disclosure consists of a mat and a box fabricated from corrugated cardboard. The inside of the box has a Neoprene liner which is attached to the box by means of an adhesive. The bottom of the mat is covered by a Neoprene based paint which has been applied after an application of a primer to this said mat underside. The mat is impregnated with Fuller's Earth by injecting a slurry of said Earth into the internal spaces of the mat's cardboard corrugations.

The cardboard mat is also pleated to permit folding such that the mat may be placed into the box both prior to and after use. This pleating is to be accomplished either by flexure of the cardboard or by the adhesion of flexible strips to adjoining sides of absorbent slats processed with absorbent and sealer in the manner described in the foregoing paragraph for the entire mat.

The said mat is sized so as to be inserted into a standard domestic garbage can.

What is claimed is:

1. An oil drip handling kit for containing oil drippings from automotive equipment, comprising a spreadable mat and a container for storage of said mat before use and for disposal of said mat after use, said mat is constructed of combinations of oil and petroleum absorbent materials, said materials are incorporated into said mat thus increasing said mats resistance to crushing, said mat has an underside sealing structure of a non-oil degradable material which is also abrasion resistant, flexible and oil impermeable, said mat is pleated so as to be adapted for folding and placement in said container, said container is provided with a liner, said liner extends around the entire interior of said container, said liner is non-oil degradable, abrasion resistant and oil impermeable, whereby in use the mat is withdrawn from said container and spread under automotive equipment so that said absorbent materials will receive any drippings, with said sealing structure preventing the oil drippings from flowing through the mat, when said mat is saturated, said mat is folded along said pleats and deposited into said container for disposal wherein said liner contains any oil drippings in said container.

* * * * *